Jan. 27, 1959 W. R. BAILEY 2,870,793
SUPPORTING MEMBERS
Filed Feb. 8, 1955 3 Sheets-Sheet 1

INVENTOR
WILLIAM RUSSELL BAILEY
BY Townsend & Beaman
ATTORNEY

Jan. 27, 1959 W. R. BAILEY 2,870,793
SUPPORTING MEMBERS
Filed Feb. 8, 1955 3 Sheets-Sheet 2
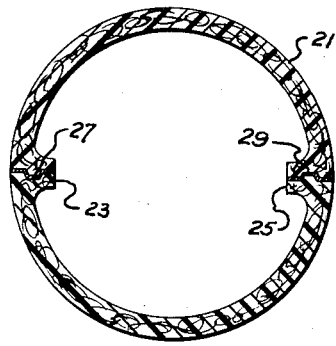
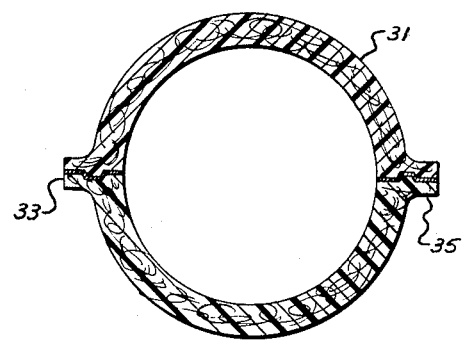
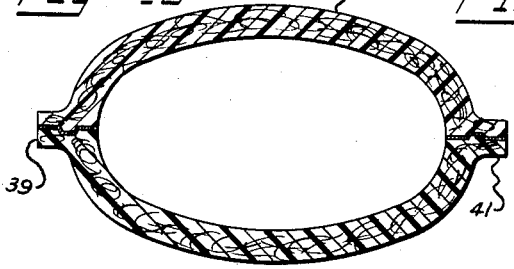
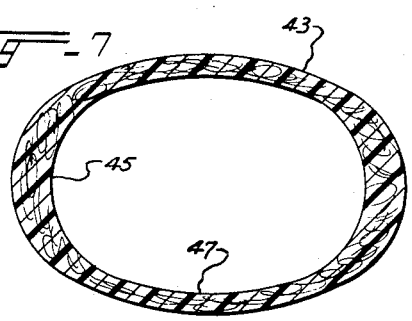
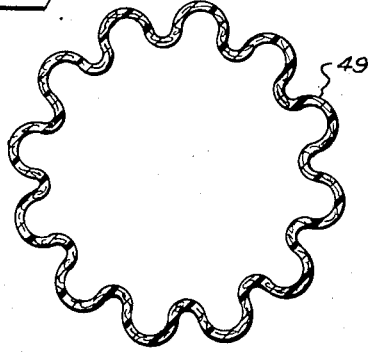
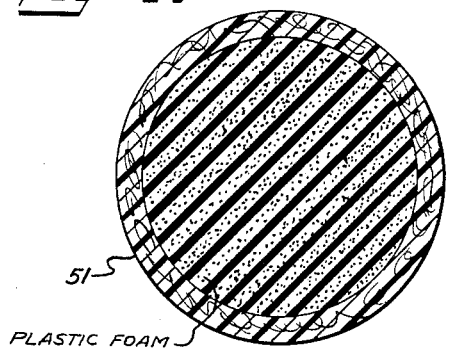
PLASTIC FOAM
INVENTOR
WILLIAM RUSSELL BAILEY
BY
ATTORNEY Jan. 27, 1959

W. R. BAILEY 2,870,793

SUPPORTING MEMBERS

Filed Feb. 8, 1955

CELLULOSIC FIBER IMPREGNATED WITH PLASTIC

INVENTOR
WILLIAM RUSSELL BAILEY

BY Townsend F Beaman

ATTORNEY

United States Patent Office 2,870,793
Patented Jan. 27, 1959

2,870,793

SUPPORTING MEMBERS

William Russell Bailey, Washington, D. C., assignor to Gar Wood Industries, Wayne, Mich.

Application February 8, 1955, Serial No. 486,946

1 Claim. (Cl. 138—78)

The present invention relates to supporting members and more particularly to electric utilities poles such as telephone poles, electric power poles, light poles, and the like.

Heretofore, the art has endeavored to provide supporting members such as electric utilities poles which would combine strength and rigidity in lateral flexure with light weight, low cost, and long service life. It has been proposed to form such poles from metal tubing; but they were then found to be exceedingly heavy, subject to corrosion, and, when used as electric utilities poles, productive of undesirable electric phenomena. It has also been proposed to form supporting members such as electric utilities poles from reinforced concrete. However, the great weight of such poles renders them highly impractical for large scale use as electric utilities poles.

Although many attempts were made to overcome the foregoing difficulties and other disadvantages, none, so far as I am aware, was entirely successful when carried into practice commercially on an industrial scale.

It has now been discovered that supporting members of greater rigidity and flexural strength may be comprised of tubular sheaths of glass fibers disposed longitudinally of the member and impregnated with a thermosetting resin.

Accordingly, it is an object of the present invention to provide a supporting member having both high rigidity and great flexural strength.

Another object of the invention is to provide an electric utilities pole which will be light in weight and inexpensive to construct, but which will exceed minimum requirements of strength and durability in service.

The invention also contemplates an electric utilities pole having greater flexural strength in one direction than in another.

It is a further object of the invention to provide a supporting member comprising a tubular sheath at least partially filled with a plastic foam.

Still another object of the invention is to provide a composite supporting member in which the strength and rigidity of each component greatly augments the strength and rigidity of each other component.

Finally, it is an object of the present invention to provide a supporting member in which the outer casing is comprised of a plurality of laminations.

Other objects and advantages will become apparent from the following description taken in conjunction with the accompanying drawings, in which:

Figures 3 through 15 are cross-sectional views similar to Figure 2 but showing some of the various embodiments in which my invention may be practiced.

Figure 1:
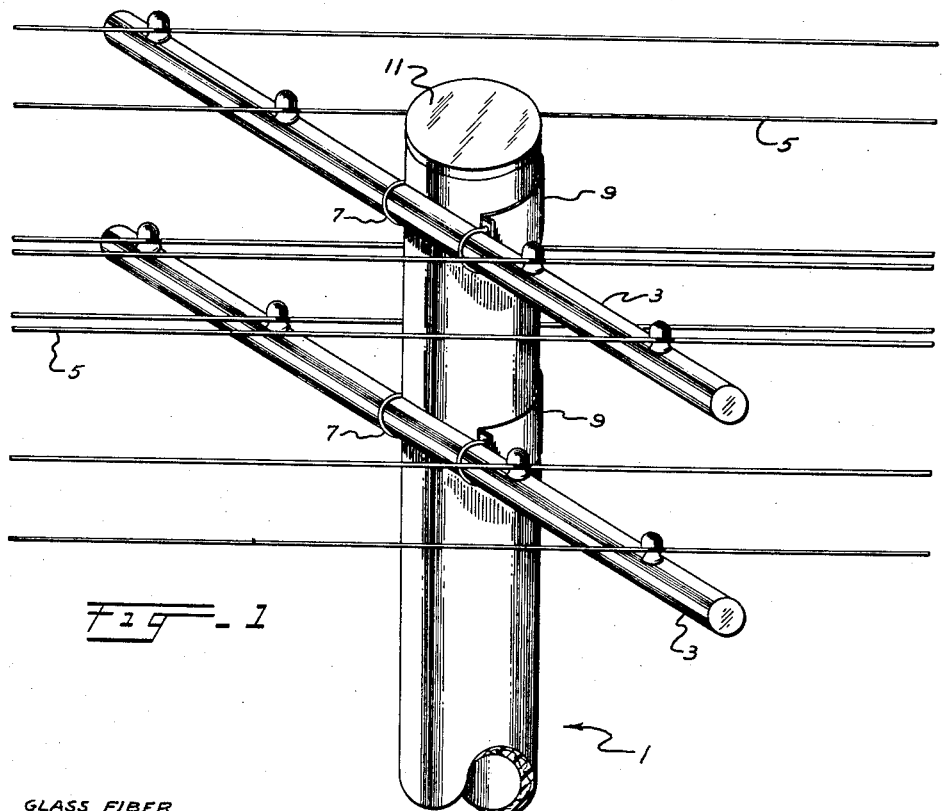
Figure 1 is a perspective view of the upper portion of an electric utilities pole illustrating by way of example one environment in which a supporting member according to my invention may be used.

Broadly stated, the present invention comprises the provision of supporting members such as electric utilities poles comprising a tubular sheath of glass fibers disposed longitudinally of the member and impregnated with a resin. The invention also comprises such members in combination with a liner for the sheath, comprising a tubular sleeve of cellulosic fiber impregnated with a thermosetting resin. Moreover, the invention also comprises a supporting member comprising a tubular sheath of alternate layers of longitudinal glass fibers, and cellulosic fibers, all the fibers being impregnated with thermosetting resin. Furthermore, the invention includes supporting members such as the above three, in combination with a plastic foam filling at least a portion of the interior of the member. Finally, the invention includes the above features in various combinations.

For purposes of this application, the following definitions of terms will apply:

A "thermosetting resin" is a heat hardening plastic capable of changing from a soluble and fusible solid to an insoluble and infusible solid on heating, and including such synthetic plastics as epoxy resins, polyester resins, phenolaldehyde resins such as Bakelite, formica, Micarta or phenolic polyalcohol-phthalic anhydride esters, urea-formaldehyde and thiourea-formaldehyde resins, or aniline formaldehyde resins, and the like.

An "epoxy resin" is the reaction product of an epihalohydrin and a polyhydric phenol. Typical epihalohydrins are epichlorohydrin, epibromhydrin, and epiiodohydrin. The latter materials are all characterized by a three-carbon chain; however, analogs of the aforesaid epihalohydrins may also be used. Examples of the latter are beta-methyl epichlorhydrin and gammamethyl epichlorhydrin. It will be noted that epifluorhydrin and its analogs are not referred to above. Inasmuch as fluorine is rather unreactive in such epoxy compounds, the latter are not contemplated herein. In view of its availability and relatively low cost, epichlorhydrin is preferred. Polyhydric phenols used in the preparation of these epoxide compositions are typified by resorcinol; hydroquinone; bis phenols, such as bis phenol A, predominantly 4-4'-dihydroxydiphenyl dimethyl methane, with lesser quantities of the 2,2- and 4,2'-isomers present. Preferred polyhydric phenols are dihydric phenols whose mono alkali metal salts have a pH from about 7 to 11; examples of such dihydric phenols are those recited above. Particularly preferred, however, is bis phenol A.

A "polyester resin" is the reaction product of a maleic-polyhydric alcohol ester preferably of a low acid number and a polymerizable alpha-substituted ethylene body, and more particularly, the reaction product of a substantially linear polyhydric alcohol ester of an unsaturated polybasic acid material of the maleic type and a substituted ethylene body of resin-forming characteristics which is co-polymerizable therewith. A filler, preferably of the fibrous type such as cellulose or asbestos may be added to retard spontaneous cure at storage temperatures. Maleic anhydride is the preferred unsaturated polybasic acid material which is esterified, but maleic acid, fumaric acid, or itaconic and citraconic acid and anhydride may be used instead. Fumaric acid gives a quicker-curing ester than maleic. Unless suitably modified, the polybasic acid should be dibasic. Also certain polybasic acids, such as maleic and citric, decompose on heating, at least in part, into acids of the maleic type, and the temperature of esterification should be adequate to accomplish the decomposition to a sufficient extent.

With further regard to the definition of a polyester resin, dihydric alcohols are the usual kind of polyhydric alcohols which react with dibasic acids to yield linear molecules or linear polyesters. Diethylene glycol is readily available; and others include ethylene glycol, triethylene glycol, trimethylene glycol, monoethylin, the propylene glycol and its derivatives. Ethylene glycol produces a final molding which is very hard but somewhat brittle; and triethylene glycol shows softness but some toughness. A mixture of dihydric alcohols may be used. The reason that dihydric alcohol is preferred is that, with dibasic acids, they yield soluble polyesters of very high molecular weight; and the higher the molecular weight the faster is the cure when mixed with the polymerizable substituted-ethylene compound. A certain amount of an alcohol containing more than two hydroxyl groups (e. g., glycerol) can be used with the dihydric alcohol, as can also some monohydric or a mixture of higher and lower (monohydric) alcohols, provided the effect of the linear, high-molecular structure is not lost.

Finally, with regard to the definition of polyester resin, the alpha-substituted ethylene compounds are of the general formula $CH_2=CR_1R_2$, where $R_1$ is a negative group such as aryl, vinyl, ethynyl, carboxyl, halogeno, O.CO.alkyl (acyloxy), CO.O.alkyl (carbalkoxy), alkoxy, aldehydo, nitrilo or halovinyl, and $R_2$ is hydrogen or an alkyl group. These compounds are in contrast with maleic acid which is an alpha-beta-substituted ethylene. Actually, the number of polymerizable bodies which are utilizable alone is limited by the solubility relations between these compounds and the maleic polyester. The maleic polyesters are miscible with most esters, aldehydes and ketones and less so with ethers and aromatic and chlorinated hydrocarbons. They are substantially immiscible with aliphatic hydrocarbons. Hence, such compounds as coumaron, indene, vinyl acetylene, vinyl chloride, butadiene, isobutene and chloroprene are used in conjunction with miscible compounds such as vinyl esters, acrylic esters, methacrylic esters, vinyl ketones, acrolein and vinyl ethers. Also compositions containing a substantial amount of highly volatile compounds like vinyl chloride are more difficult to mold. Styrene is readily applicable.

"Plastic foam" is a light weight rigid mass of which the greatest part of the volume is comprised of entrapped pockets of gas separated by thin, irregular, polygonal webs of thermosetting plastic or thermoplastic, such as phenolic or polystyrene or cellulose acetate.

Referring now to the drawings in greater detail, I have shown in Figure 1 the upper portion of a hollow electric utilities pole illustrating one use to which a supporting member according to my invention may be put. Pole 1 is provided with a plurality of cross arms 3 which may also be formed according to the invention for supporting a plurality of wires 5. Cross arms 3 are clamped to pole 1 by means of U-bolts 7 fitted around the cross arms and held tightly against the pole by clamping straps 9. Pole 1 is closed at its top with a cap 11 and at its bottom beneath the surface of the ground with another cap (not shown), for the exclusion of dirt and water from the interior of the pole.

Figure 2:
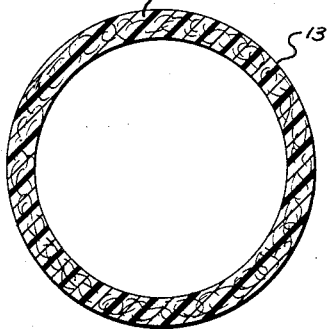
Figure 2 is a cross-sectional view of the main body portion of the electric utilities pole of Figure 1.

In Figure 2, I have shown a cross-sectional view of a supporting member according to my invention. It will be seen that supporting member 13 forms a closed, hollow cylindrical pole. Figure 2 is lined to show glass fiber impregnated with plastic; and according to my invention, the plastic is a thermosetting resin. In this way, a supporting member having great structural strength and relatively light weight is provided. The structural strength of such a pole comprises most notably high modulus of elasticity in flexure combined with high bending and ultimate strength. To this end, the glass fibers are disposed longitudinally of the pole and may run full length thereof.

Figure 3:
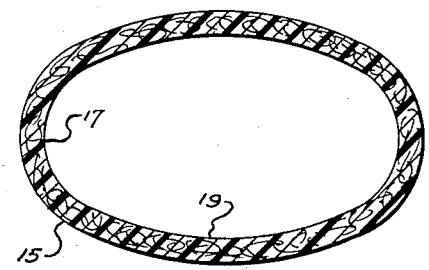

In Figure 3, I have illustrated another embodiment of my invention comprising a generally elliptically cross-sectioned supporting member formed from longitudinally disposed glass fibers impregnated with a thermosetting resin. It has been found that such a configuration gives great strength in flexure in the direction of the major axis of the ellipse. Hence, such a configuration is especially well adapted for use in the electric utilities poles, in which great strength must be provided in a plane perpendicular to the electric wires, but in which very little strength need be provided in directions parallel to the wires. Thus, an electric utilities pole having a cross-section as in Figure 3, mounted with the minor axis of the ellipse parallel to the wires, will be found to have greatly improved strength characteristics under the conditions of loading found in the case of electric utilities poles. Thus, in the elliptical supporting member 15 of Figure 3, the major axis intersects adjacent 17 and the minor axis intersects adjacent 19.

In Figure 4, I have illustrated another embodiment of my invention. It will be seen that in this embodiment, supporting member 21 is comprised of a pair of semi-cylindrical halves, each provided at its side edges with inwardly directed flanges 23 and 25 formed integrally therewith. Flange 23 is provided with a locating groove 27; and flange 25 is provided with a locating ridge 29. It will be noted that ridge 29 and groove 27 are complementary to each other, so that the two halves may be fitted together quickly and with accuracy. The flanges are then cemented or glued or otherwise bonded to each other to form a closed, hollow cylindrical pole with a smooth cylindrical outer surface. It will be seen that a supporting member according to Figure 4 may be constructed by forming an indefinite length of glass fiber impregnated with thermosetting resin in the shape of one of the halves of supporting member 21, cutting the indefinite length into sections the length of the desired supporting member, and turning one of the half sections over onto complementary edgewise abutting relationship with the other section of half.

In Figure 5, I have shown still another embodiment of my invention, comprising a supporting member 31 having outwardly directed complementarily ridged and grooved flanges 33 and 35. Although the outward disposition of the flanges to some extent spoils the smooth outer surface of the supporting member, it will be appreciated that in the case of electric utilities poles, such outwardly projecting flanges are quite useful for the purpose of attaching climbing lugs and crossbars to the poles.

In Figure 6 is illustrated another embodiment comprising a supporting member 37 of generally elliptical shape and formed from a pair of complementary semi-elliptical halves having outwardly projecting flanges 39 and 41 bearing complementary ridges and grooves as in the case of the embodiments of Figures 4 and 5. It will be noted that the flanges of the elliptical pole shown in cross-section in Figure 6 are disposed substantially at the major radii of the ellipse comprising the cross-section of the pole, that is to say, at the intersection of the major axis of the ellipse with the side walls of the pole. It has been found that such a configuration gives much greater strength in flexure in the direction of the major axis of the ellipse. Hence, such a configuration is additionally well adapted for use in electric utilities poles, in which great strength must be provided in a plane perpendicular to the electric wires, as noted above.

In Figure 7, I have shown still another embodiment of elliptical supporting member 43 having a relatively thick wall portion 45 adjacent the intersection of the major axis of the ellipse and a relatively thin wall portion 47 adjacent the intersection of the minor axis of the ellipse. The purpose of providing relatively thick portion 45 is to provide even better characteristics of flexural strength in the direction of the major axis than in the embodiment of Figure 3.

In Figure 8, I have shown still another embodiment of my invention comprising a generally cylindrical pole of longitudinally disposed glass fiber impregnated with a thermosetting resin and consisting of a tubular corrugated sheath comprising supporting member 49. It will be noted that the flutings or corrugations are disposed longitudinally of the supporting member and run substantially full length thereof. It has been found that a supporting member having this configuration has even greater flexural strength characteristics than a cylindrical pole as in Figure 2.

In Figure 9, I have shown in cross-section a major embodiment of my invention comprising a supporting member 51 having an outer casing comprising a generally cylindrical tubular sheath of glass fiber impregnated with thermosetting resin, of which the interior surface defines a cylindrical void which is at least partially filled with a plastic foam. This plastic foam need not be provided full length of the tube. Indeed, in the case of an electric utilities pole, it is necessary to provide plastic foam, when desired, only adjacent the lower end of the tube. In this way, the foam not only serves as a seal to prevent leakage of ground water upwardly into the pole, but also serves greatly to reinforce the pole adjacent the lower end thereof, where failure is much more likely to occur under stress, than at the upper end of the pole.

Figure 10:
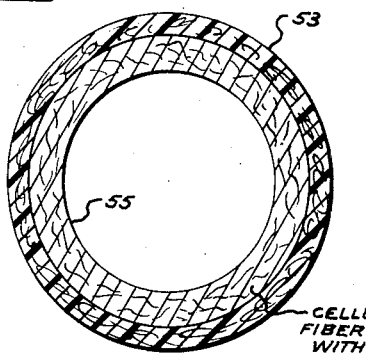

In Figure 10, I have shown another major embodiment of my invention in cross-section, comprising a supporting member 53 of which the outer casing is comprised of glass fibers longitudinally disposed and impregnated with a thermosetting resin. In addition, a liner or inner sleeve 55 is provided, which contacts the outer casing about the interior surface thereof and forms with the outer casing a composite pole consisting of a plurality of annular shells. Inner sleeve 55 may be of any cellulosic fiber impregnated with a thermosetting resin, such cellulosic fibers including by way of example cotton, cardboard, wood fiber, other types of paper pulp, and the like. The thermosetting resin used as an impregnant will preferably be chosen on a cost basis; and for this purpose, a phenolic resin such as phenol-formaldehyde is desirably cheap.

Figure 11:
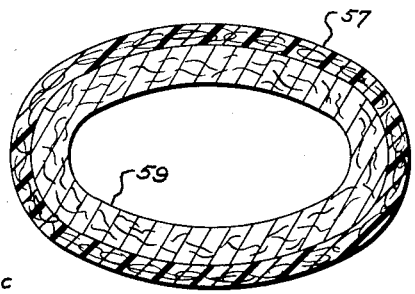

In Figure 11, another embodiment is shown in cross-section as comprising a supporting member 57 as in Figure 10, but having a generally elliptical shape in cross-section. For this purpose, liner or inner sleeve 59 of cellulosic fiber impregnated with thermosetting resin will also be elliptical in shape. As noted above, a supporting member of this type is particularly well suited for use as an electric utilities pole.

Figure 12:
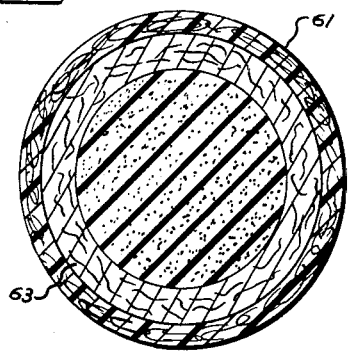

Figure 12 depicts another embodiment of my invention comprising supporting member 61 having an outer casing of glass fiber impregnated with thermosetting resin and having a liner or inner sleeve 63 of cellulosic fiber impregnated with thermosetting resin, and having the central void of the member filled over at least a portion of its length with a plastic foam. It will be seen that the embodiment of Figure 12 is basically that of Figure 10 with the addition of plastic foam; and it has been found that a supporting member constructed according to Figure 12 will have substantially greater flexural strength than an otherwise similar member constructed according to Figure 10, despite the fact that the plastic foam by itself has virtually no flexural strength.

Figure 13:
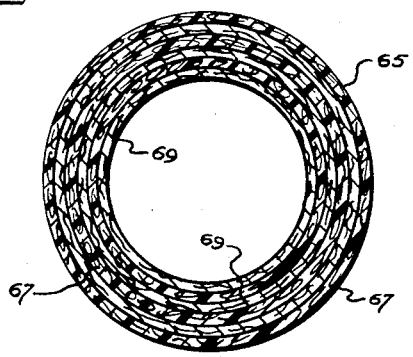

In Figure 13, I have shown a major embodiment of my invention in cross-section, comprising a supporting member 65 made up of a plurality of relatively thin layers of glass fiber 67 impregnated with a thermosetting resin and disposed longitudinally of the member and spaced apart by alternately disposed relatively thin layers of cellulosic fiber 69 impregnated with a thermosetting resin. Thus, it will be seen that the embodiment of Figure 13 comprises a multi-layer, composite or laminated tubular sandwich comprised of a layer of glass fiber, a layer of cellulose fiber, a layer of glass fiber, a layer of cellulose, and so on. It has been found that such a supporting member has extremely high ultimate strength without being brittle. The outer layer may of course be either glass fiber or cellulosic fiber; but as the layers of glass fiber are ordinarily somewhat stronger than those of cellulosic fiber, it is preferred to form the outermost layer of impregnated glass fiber. The innermost layer may be either glass fiber or cellulosic fiber. Alternatively, instead of forming the composite from a plurality of annular cylindrical layers, the supporting member of Figure 13 may be formed by rolling up single, continuous webs of a layer of glass fiber on a layer of cellulose fiber, or vice versa, into a composite roll. Such single webs are preferably of a width equal to the desired length of the supporting member. The glass fiber and cellulosic fibers may be respectively impregnated with different thermosetting resins; but for purposes of simplicity it is preferred to impregnate the laminated unit with a single composition comprising a thermosetting resin or a mixture of various resins, at least a major portion of which are thermosetting resins.

Figure 14:
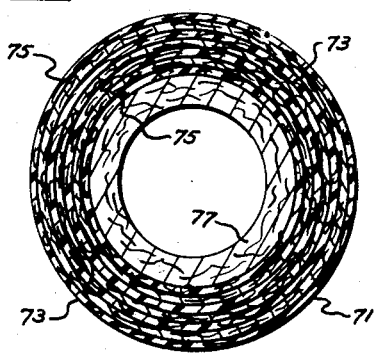

In Figure 14, I have shown another embodiment of my invention comprising a supporting member 71 which is like the embodiment of Figure 13 in that it comprises a plurality of alternately disposed layers of glass fiber 73 and layers of cellulosic fiber 75, but differs in that it additionally comprises a liner or inner sleeve 77 of cellulosic fiber impregnated with thermosetting resin, liner 77 being of substantially greater thickness than any of the relatively thin layers 73 or 75. In short, the embodiment of Figure 14 differs from that of Figure 13 as the embodiment of Figure 10 differs from that of Figure 2. Although the liner 77 of the embodiment of Figure 14 is nothing but a thicker version of the innermost layer 69 of the embodiment of Figure 13, nevertheless, a disproportionately greater increase in ultimate strength occurs by virtue of addition of liner 77 than could be calculated on the basis of the embodiment of Figure 13.

Figure 15:
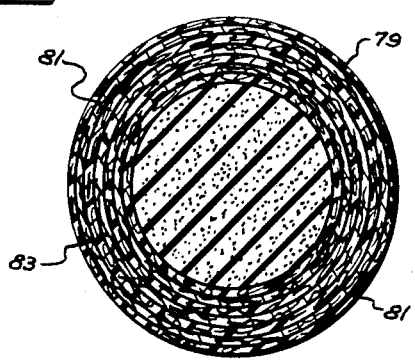

As a final illustrated embodiment of my invention, I have shown in Figure 15 a supporting member 79 of which the outer casing is a composite of plural, relatively thin layers of glass fiber 81 and alternate, relatively thin layers of cellulosic fiber 83, as in the embodiments of Figures 13 and 14. However, the interior cylindrical void defined by the interior surface of this outer casing has been at least partially filled with a plastic foam, with the result that the flexural and ultimate strength of the supporting member has been enormously increased.

Throughout the drawings, the same symbols indicate the same materials. Thus, Figure 2 is specifically lined for glass fiber impregnated with plastic; and according to the invention, this comprises longitudinally disposed glass fiber impregnated with a thermosetting resin. Thus, throughout the drawings, that same symbol designates that same material, as also in the case of the cellulosic liners and plastic foam.

The foregoing illustrated embodiments are illustrative only and by no means exhaustive of the various embodiments in which my invention may be practiced. It will be appreciated that various combinations of cross-sectional contour, joint structure and combinations of casing, liner and foam may be made by those skilled in the art without departing from the spirit or scope of my invention.

For the purpose of giving those skilled in the art a better understanding of the invention and a better appreciation of the advantages thereof, the following illustrative examples are given:

*Example I*

A linear of cellulosic fiber impregnated with a thermosetting resin, according to my invention, was formed from a cardboard tube known as a "kraft" tube having an inside diameter of 2 inches and a wall thickness of 0.060 inch. The tube was impregnated with phenolic resin which was then condensed at elevated temperature until maximum hardness and strength were reached. The phenolic resin was that type sold commercially by the Synvar Corporation as "Synvar CP66X," a phenol-formaldehyde resin which is alcohol-water soluble before condensation. The tube was then clamped by one end in a dynamometer and an increasing lateral pull exerted at a distance of 56 inches above the base. At a lateral pull of 5 pounds, the lateral deflection was 2 inches. The lateral pull was increased above 5 pounds and the tube soon bent and broke. Thus it was seen that the liner alone possessed very little flexural strength. The modulus of elasticity of the tube in lateral flexure was calculated according to the well known formula $$E = \frac{Pl^3}{3yI}$$

where E equals the flexural modulus of elasticity, P equals the lateral force, $l$ equals the distance from the base at which the force is applied, $y$ is the lateral deflection at that P, and I is the moment of inertia of the body tested. P is known to be 5 pounds, $l$ is 56 inches and $y$ is 2 inches; but I must be calculated according to the formula $$I = \frac{\pi}{4}(a_o^4 - a_i^4)$$

where $a_o$ is the outside radius of the tube and $a_i$ is the inside radius of the tube. $a_o$ is known to be 1.060 inches and $a_i$ is known to be 1.000 inch, with the result that the moment of inertia I is calculated to be 0.206 inch⁴. Thus, substituting in the first formula, the flexural modulus of elasticity E is found to be 712,000 pounds per square inch.

*Example II*

As an example of a pole not within the contemplation of my invention, a round tube was formed of longitudinally disposed glass fibers running full length thereof, but impregnated with cured polyester resin, a material lying outside the scope of my invention when used in any of the embodiments of Figures 2 through 8. The polyester resin was that sold commercially by the Celanese Corporation of America as "MR-28VS Resin." The glass fiber was in the form of unidirectional glass cloth, that is to say, cloth in which almost all of the fibers run in one direction, only an occasional cloth fiber being provided to hold the cloth together laterally. The glass fibers running in the principal direction longitudinally of the completed tube were from 0.00020 to 0.00025 inch in diameter. The completed tube was comprised of 33.4% polyester resin by weight, the remainder glass. It had an inside diameter of 2.083 inches and a wall thickness of 0.0355 inch. When tested in a dynamometer as in Example I, a load of 14.1 pounds applied 56 inches from the base is a deflection of 4 inches. Thus, by the method described in Example I, the flexural modulus of elasticity was calculated to be 1,562,000 pounds. The tube finally broke at a load of 15 pounds and a final deflection of 5¾ inches.

The ultimate strength of the tube, that is, the unit area stress in the tube at failure, was calculated according to the formula $$S_m = \frac{Mc}{I}$$

where $S_m$ is the stress at failure, M is the moment or breaking force times distance, $c$ equals $a_o$ which is the outside radius of the tube, and I is the moment of inertia of the body tested. Thus, the breaking strain $S_m$ is calculated in this case to be 6,840 pounds per square inch. These figures for the breaking strain and flexural modulus will be seen to be vastly inferior to the comparable figures attained with poles according to my invention as demonstrated in further examples.

*Example III*

As a further example of a pole not within the contemplation of my invention, another round tubular pole was formed of glass fiber impregnated with polyester resin when used in any of the embodiments of Figures 2 through 8. The polyester resin was that sold commercially by the Celanese Corporation of America as "MR-28VS Resin." This pole had an inside diameter of 2.097 inches and a wall thickness of 0.033 inch. The resin comprised 32.8% of the pole by weight, remainder glass. However, in this instance, the pole had been formed by wrapping impregnated strips of glass fiber in a spiral form prior to heating. Thus, the glass fibers, which had the same diameter as in Example II, were disposed spirally about the tube rather than longitudinally thereof. When tested in a dynamometer as in Examples I and II, with an effective length of 56 inches, a force of 5 pounds produced a lateral deflection of 3 inches and the tube failed shortly thereafter. Accordingly, the flexural modulus of elasticity was calculated by the above method to be only 799,000 pounds per square inch, which is only a small fraction of the strength and rigidity possessed by poles according to the invention, as will be seen later.

*Example IV*

As a first example of a pole according to my invention, a round tube was formed from longitudinally disposed glass fibers running full length thereof and impregnated with a cured epoxy resin. The glass fibers were in the form of unidirectional glass cloth as described in Example II. The epoxy resin was that type sold commercially by the Shell Chemical Corporation as "Epon 828," an epoxy resin having a melting point of 9° C., a viscosity of 12,400 centipoises at 25° C., a specific gravity at room temperature of 1.1676, an epoxy value of 0.52 as measured by the pyridinium chloride method, a hydroxol value of 0.08 as measured by the lithium aluminum hydride method, and an esterification value of 1.26. The glass cloth was preheated to drive off the moisture and immersed in the resin bath which was held at around 150° F. The bath contained a catalyst comprising a monoethylamine complex of boron trifluoride, in an amount of 5% by weight. The excess resin was then pressed from the sheet, the sheet formed to shape and run through a curing furnace or oven where it was held at around 250° F. for about 45 minutes until it had cured to maximum hardness and strength. The completed tube had an inside diameter tapering from 2.022 inches to 2.144 inches and a wall thickness of 0.038 inch. The tube contained 50.1% resin, remainder glass. The tube was clamped in a dynamometer as in the previous examples, and a force applied 56 inches above the base. A lateral force of 29.9 pounds produced a lateral deflection of 6 inches; and the tube failed shortly thereafter. The flexural modulus of elasticity was calculated by the above method at 2,045,000 pounds per square inch. The stress at failure was calculated by the method outlined in Examples II as 12,640 pounds per square inch, nearly double that of Example II. It will be noted that this modulus and strength is substantially higher than that of a similar tube employing a different resin, as seen in Example II, despite the fact that the tube of Example II contained a substantially greater number of glass fibers.

*Example V*

As another example of a hollow pole within the contemplation of my invention, a pole having the general cross-sectional configuration shown in Figure 7 of the drawings was constructed. This pole was constructed of the same materials and under the same conditions of time, temperature and catalysis as the pole described in Example IV. The finished pole was comprised of 41.83% resin, the remainder glass, and had an inside diameter along the major axis of 2.150 inches and an inside diameter along the minor axis of 1.070 inches. The wall thickness tapered from a minimum of 0.040 inch at the intersection of the minor axis to a maximum of 0.066 inch at the intersection of the major axis. When tested in the dynamometer as in the previous examples, the pole was found to have a flexural modulus of elasticity of 2,170,000 pounds per square inch. The pole finally broke at a pressure of 62 pounds and a lateral deflection of 13¾ inches at a distance of 56 inches from the base. It will be noted that the material of which this pole was formed was the same as the material in Example IV, except that the weight percent of glass fibers was higher. Accordingly, it is believed that the somewhat higher modulus of elasticity in flexure in the present example as compared with Example IV is due to this higher percentage of glass fiber. The much greater failure strength of the present pole as compared to the pole of Example IV is largely due to its unique shape.

*Example VI*

As a further example of a pole according to my invention, a pole was constructed having a general cross-sectional arrangement as seen in Figure 10 of the drawings. A "kraft" tube having an inside diameter of 2 inches and a wall thickness of 0.070 inch and impregnated with phenolic resin as in Example I was disposed inside a tube of glass fiber impregnated with an epoxy resin and having a 2.140 inch inside diameter and a wall thickness of 0.034 inch. The outer casing of glass fiber was constructed in the same manner as in Example IV, except that as a catalyst, 23% of metaphenylamine diamine was used in the resin bath. The casing contained 35.2% resin by weight, remainder glass. When tested in the dynamometer as in the above examples, the composite tube showed a deflection of 6 inches when a force of 50.7 pounds was applied 56 inches from the base and in a lateral direction. The composite tube finally broke under a pressure of 117 pounds applied laterally and at a lateral deflection of 16¼ inches. In order to calculate the modulus of elasticity of the outer casing of impregnated glass fiber, it was necessary to work from the known modulus of elasticity of the impregnated "kraft" tube, as found in Example I. Thus, the stress values for the liner impregnated with phenolic resin could be found from the following formula:

$$P_1 = \frac{3E_1 I_1 y}{l^3}$$

The subscript 1 is used to designate the values and symbols relating to the liner; and the subscript 2 will be used to designate the values and symbols pertaining to the outer casing of impregnated glass fiber. Thus, for a liner modulus of elasticity of 712,000 pounds per square inch, a liner moment of inertia of 0.244 inch⁴, a lateral deflection of 6 inches and a length of 56 inches, $P_1$ is calculated to be 17.8 pounds. $P_2$ is the total P minus $p_1$, or 32.9 pounds. Thus, the values are now available for substitution in the formula to determine the modulus of flexural elasticity of the outer glass fiber casing:

$$E_2 = \frac{P_2 l^3}{3 y I_2}$$

where $P_2$ equals 32.9 pounds, $l$ equals 56 inches, $y$ equals 6 inches, and the moment of inertia of the glass fiber outer casing is calculated to be 0.1372 inch⁴. Thus, the modulus of flexural elasticity of the glass outer casing is calculated to be an astonishingly high 2,345,000 pounds per square inch. No reason is known why the combination with the liner should raise the modulus of elasticity of the material of the casing; and it can only be concluded that this result constitutes an unexpected and dramatic improvement in the flexural strength of the casing.

However striking the improvement in the flexural strength of the casing may by virtue of the addition of the liner, the improvement in the stress at failure was even more marked. Taking the breaking force applied to the casing and liner as portions of the total breaking force proportional to $P_1$ and $P_2$, the stress at failure of the outer casing was calculated at 34,200 pounds per square inch and that of the liner as 10,080 pounds per square inch. Thus, the failure stress of the casing is almost trebled by adding the liner, as will be seen by comparison with Figure 4. Moreover, even the impregnated liner was carrying almost twice as much stress at failure as was the impregnated glass fiber of Example II lying outside of my invention.

*Example VII*

As a further example of a pole according to my invention, another pole was constructed having a general cross-sectional arrangement as seen in Figure 10 of the drawings. A "kraft" tube having an inside diameter of 2 inches and a wall thickness of 0.0032 inch and impregnated with phenolic resin as in Example I was disposed inside a tube of glass fiber impregnated with a polyester resin and having a 2.064 inch inside diameter and a wall thickness of 0.041 inch. The outer casing of glass fiber was constructed in the same manner as in Example II, except that Celanese "MR-28C Resin" was used. Curing was at 250° F. for one hour. The casing contained 40.9% resin by weight, remainder glass. When tested in the dynamometer as in the above examples, the composite tube showed a deflection of 6 inches when a force of 45 pounds was applied 54 inches from the base and in a lateral direction. The composite tube finally broke under a pressure of 95 pounds applied laterally and at a lateral deflection of 13 inches. When calculated according to the method of Example VI, the modulus of flexural elasticity of the glass outer casing is seen to be 2,130,000 pounds per square inch. The stress at failure of the outer casing is 29,700 pounds per square inch and that of the liner is 9,370 pounds per square inch. These figures are seen to be roughly in line with the values for the corresponding calculations of Example VI.

*Example VIII*

As a further example of a supporting member according to my invention, still another pole was constructed having a general cross-sectional arrangement as seen in Figure 10 of the drawings. A "kraft" tube having an inside diameter of 2 inches and a wall thickness of 0.051 inch and impregnated with phenolic resin as in Example I was disposed inside a tube of glass fiber impregnated with a phenolic resin as in Example I and having a 2.102 inch inside diameter and a wall thickness of 0.035 inch. The phenolic resin of Example I impregnated both the outer casing and the liner. The casing contained 40.9% resin by weight, remainder glass. Curing was conducted for five hours at 180° F., and for one hour at 200° F. When tested in the dynamometer as in the above examples, the composite tube showed a deflection of 6 inches when a force of 47.4 pounds was applied 54 inches from the base and in a lateral direction. The composite tube finally broke under a pressure of 94.6 pounds and at a lateral deflection of 12½ inches. Calculations conducted according to the method outlined in Example VI showed that the flexural modulus of elasticity was 2,200,000 pounds per square inch, that the stress at failure of the outer casing was 29,300 pounds per square inch and that of the inner liner 9,040 pounds per square inch. These figures seem to be roughly comparable to the corresponding figures in Examples VI and VII.

*Example IX*

As a further example of a supporting member according to my invention, a pole was constructed having a general cross-sectional arrangement as seen in Figure 13 of the drawings. Two thicknesses of "50-pound kraft" paper, each thickness 0.005 inch thick, were placed together to form a paper sheet 0.010 inch thick and a thin layer of glass fiber as in Example II was placed on the sheet with the paper and fiber impregnated with the epoxy resin of Example IV and the curing catalyst of Example VI. On top of this first layer of paper and glass fiber, a second composite layer of paper and glass fiber was placed, and a third, until the structure shown in Figure 13 was achieved, with alternate layers of paper and glass fiber. The desired tubular cylindrical form was built up on a mandrel. The laminated, multi-layer tube was secured for one hour at 200° F. and for two and one-half hours at 325° F. The thermosetting resin impregnated all layers of the tube and set to a uniformly hard, durable finished product having 54.1% by weight organic content comprising paper and resin, remainder glass. The finished pole had an inside diameter tapering from 2⅛ inches at the base to 2 inches adjacent the upper end and a 0.083 wall thickness. When tested in the dynamometer as in the above examples, the laminated tube showed a deflection of 6 inches when a force 67.2 pounds was applied 54 inches from the base and in a lateral direction. The composite laminated tube finally broke under a pressure of 188.2 pounds applied laterally and at a lateral deflection of 18¼ inches. The flexural modulus of elasticity for the entire tube is calculated at 1,820,000 pounds per square inch. The stress at breaking for the entire tube is calculated at 35,200 pounds per square inch. However, it must be remembered that these figures for modulus of elasticity and ultimate stress are a composite of those for the glass fiber and the paper. Hence, it will be obvious that the values for the glass fiber alone would be substantially higher than the calculated composite figures.

*Example X*

As a final example of a pole according to my invention, a pole was constructed having the general cross-sectional configuration shown in Figure 9 of the drawings. The outer casing of glass fiber impregnated with epoxy resin was constructed in the same way and from the same materials under the same temperatures with the same time factor and catalyst as in the case of the outer glass fiber shell of Example VI. The completed outer shell had an inside diameter tapering from 2.022 inches at the top to 2.144 inches at the bottom and side wall tapering from 0.060 inch in thickness at the top to 0.050 inch thickness at the bottom. The casing contained 36.05% resin by weight, remainder glass. The interior of the casing was filled with plastic foam comprising phenolic foaming resin No. 12,313 of the General Electric Company. The materials for producing this foam were mixed as supplied and directed by that company; and in the resulting exothermic reaction, a foam of cellular thermosetting plastic was produced which quickly solidified as a light, rigid material filling the interior of the pole. The pole was then tested in the dynamometer by the method described above; and at a lateral pressure of 61.5 pounds applied 56 inches above the base, a deflection of 8 inches was noted. The pole finally broke at a pressure of 102 pounds and a lateral deflection of 15¾ inches. When the modulus of elasticity was calculated by the above method, it was found to be an astoundingly high 4,390,000 pounds per square inch. Equally surprising, the stress at breaking was found to be 59,400 pounds per square inch. This result is thought to be truly amazing, since the foam itself has but a negligible flexural strength and modulus of elasticity.

It will also be appreciated that although the use of unidirectional glass cloth has been described, other forms of glass fiber may be used. For example, glass fiber in the form of a tape comprising a plurality of fibers disposed in substantial parallelism and arranged in the general form of a broad, flat ribbon, may be used. Another convenient form of glass fiber is "roving," which is glass fiber in the form of a plurality of bundles, each bundle comprising in turn a plurality of fibers in substantial parallelism.

It will also be appreciated that with regard to the impregnant for the cellulosic fiber liner, it is not necessary to use pure thermosetting resins. A resin such as a phenolic might be diluted with casein, or even replaced entirely with a sizing material such as starch or casein. If a water-soluble sizing material was substituted for a resin in a liner impregnant, then it would be desirable to coat the interior of such an impregnated liner with some waterproofing material such as polyvinyl chloride or wax or a rubber base compound.

Moreover, it is not necessary that a single thermosetting resin be used for the impregnant either of the glass fiber or the liner of any embodiment of my invention. It will be appreciated that a mixture of thermosetting resin may yield improved properties under certain conditions of manufacture and that various mixtures of thermosetting resins, as well as thermosetting resins mixed with substances that do not substantially alter their properties, are comprehended by the invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

I claim:

An elongated supporting member having great longitudinal compressive and lateral flexural strength, comprising a hollow cardboard tube which by itself is self-supporting and is impregnated with a thermosetting resin, and an outer tubular sheath of glass fibers encompassing said cardboard tube and disposed longitudinally and extending full length of said cardboard tube, said glass fibers being impregnated with and bonded directly to the cardboard tube by an epoxide resin, and said cardboard tube having a wall thickness substantially greater than the wall thickness of said sheath of glass fibers.

References Cited in the file of this patent

UNITED STATES PATENTS

| | | |
|---|---|---|
| 45,083 | Savoral | Nov. 15, 1864 |
| 2,360,109 | Converse | Oct. 10, 1944 |
| 2,466,271 | Pfleumer | Apr. 5, 1949 |
| 2,552,599 | Stout | May 15, 1951 |
| 2,571,692 | Dubois | Oct. 16, 1951 |
| 2,571,717 | Howald et al. | Oct. 16, 1951 |
| 2,594,693 | Smith | Apr. 29, 1952 |
| 2,594,838 | Alexander et al. | Apr. 29, 1952 |
| 2,602,037 | Nelb | July 1, 1952 |
| 2,626,223 | Sattler et al. | Jan. 20, 1953 |
| 2,653,887 | Slayter | Sept. 29, 1953 |
| 2,694,661 | Meyer | Nov. 16, 1954 |
| 2,742,931 | De Ganahl | Apr. 24, 1956 |

FOREIGN PATENTS

| | | |
|---|---|---|
| 82,653 | Austria | Feb. 10, 1921 |

OTHER REFERENCES

"Modern Plastics" publication, November 1950, pages 113, 114, 116, 118, 120, 122, "Epoxy Resins in Glass-Cloth Laminates."